(12) United States Patent
Maruyama

(10) Patent No.: US 10,871,091 B2
(45) Date of Patent: Dec. 22, 2020

(54) POWER SYSTEM

(71) Applicant: HONDA MOTOR CO., LTD., Tokyo (JP)

(72) Inventor: Megumi Maruyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 518 days.

(21) Appl. No.: 15/835,998

(22) Filed: Dec. 8, 2017

(65) Prior Publication Data
US 2018/0171838 A1    Jun. 21, 2018

(30) Foreign Application Priority Data

Dec. 20, 2016   (JP) .................................. 2016-247119

(51) Int. Cl.
*F16H 57/04* (2010.01)
*F01M 9/06* (2006.01)
(Continued)

(52) U.S. Cl.
CPC ................. *F01M 9/06* (2013.01); *B60K 1/00* (2013.01); *B60K 7/0007* (2013.01); *B60K 17/046* (2013.01); *B60K 17/16* (2013.01); *F01M 11/00* (2013.01); *F16H 57/037* (2013.01); *F16H 57/045* (2013.01); *F16H 57/0424* (2013.01); *F16H 57/0457* (2013.01); *F16H 57/082* (2013.01); *F16N 7/26* (2013.01); *F16N 7/28* (2013.01); *B60K 2001/001* (2013.01); *B60K 2007/0092* (2013.01); *B60Y 2200/91* (2013.01); *F01M 2011/0033* (2013.01); *F16H 57/021* (2013.01); *F16H 57/0423* (2013.01); *F16H 57/0471* (2013.01); *F16H 57/0476* (2013.01); *F16H 57/0479* (2013.01);
(Continued)

(58) Field of Classification Search
CPC .................................................... F16H 57/0424
See application file for complete search history.

(56) References Cited

U.S. PATENT DOCUMENTS

| 8,191,696 B2 * | 6/2012 | Hirota ..................... F16D 13/72 |
| | | 192/113.34 |
| 9,074,678 B1 | 7/2015 | Marsh, Jr. et al. |

(Continued)

FOREIGN PATENT DOCUMENTS

| CN | 1573171 A | 2/2005 |
| JP | S58-181054 U | 12/1983 |

(Continued)

OTHER PUBLICATIONS

Dec. 2, 2019, Chinese Office Action issued for related CN Application No. 201711267962.3.

(Continued)

*Primary Examiner* — Derek D Knight
(74) *Attorney, Agent, or Firm* — Paratus Law Group, PLLC

(57) ABSTRACT

A power system includes: a rotating body; a housing that accommodates the rotating body; and a storage portion that is provided in a bottom of the housing to store a liquid medium. The rotating body is partially located in the storage portion, and an inner surface of the housing includes a protrusion that extends above the rotating body to intersect with a rotation direction of the rotating body.

10 Claims, 7 Drawing Sheets

(51) Int. Cl.
| | |
|---|---|
| *F01M 11/00* | (2006.01) |
| *F16N 7/28* | (2006.01) |
| *F16H 57/037* | (2012.01) |
| *F16N 7/26* | (2006.01) |
| *F16H 57/08* | (2006.01) |
| *B60K 1/00* | (2006.01) |
| *B60K 17/16* | (2006.01) |
| *B60K 17/04* | (2006.01) |
| *B60K 7/00* | (2006.01) |
| *F16H 57/021* | (2012.01) |
| *F16H 57/02* | (2012.01) |

(52) U.S. Cl.
CPC .. *F16H 57/0483* (2013.01); *F16H 2057/0216* (2013.01); *F16H 2057/02034* (2013.01); *F16H 2700/00* (2013.01)

(56) References Cited

U.S. PATENT DOCUMENTS

2004/0242363 A1   12/2004  Kohno et al.
2009/0008207 A1    1/2009  Hirota et al.

FOREIGN PATENT DOCUMENTS

| JP | 2000-257706 A | | 9/2000 |
|---|---|---|---|
| JP | 2002-357233 A | | 12/2002 |
| JP | 2002357233 A | * | 12/2002 |
| JP | 2003-065422 A | | 3/2003 |
| JP | 2007-120519 A | | 5/2007 |
| JP | 2010-270816 A | | 12/2010 |
| WO | WO 2007/100011 A1 | | 9/2007 |

OTHER PUBLICATIONS

Oct. 2, 2018, Japanese Office Action issued for related JP application No. 2016-247119.

* cited by examiner

POWER SYSTEM

CROSS-REFERENCE TO RELATED APPLICATION(S)

This application claims priority from Japanese Patent Application No. 2016-247119 filed on Dec. 20, 2016, the entire contents of which are incorporated herein by reference.

FIELD

The present invention relates to a power system that is provided in an electric motor vehicle.

BACKGROUND

There is known a power system that includes a rotating body, a housing for accommodating the rotating body, and a storage portion provided at a bottom of the housing to store lubricating oil. A part of the rotating body is located in the storage portion, and the lubricating oil stored in the storage portion is splashed with rotation of the rotating body and is supplied to a necessary portions in the housing.

Further, a technique is disclosed in JP-A-2010-270816 in which a part, which is located above a rotating body, of an inner surface of a housing has surface roughness larger than that of an upstream side part in a rotation direction of the rotating body, thereby making it easier for lubricating oil to stay in the part above the rotating body.

In the power system disclosed in JP-A-2010-270816, however, even if the lubricating oil splashed by the rotating body can easily stay in the part above the rotating body, there is still room for improvement in that the lubricating oil can hardly spread over a wide range.

SUMMARY

The invention is to provide a power system in which lubricating oil splashed by a rotating body can spread over a wide range.

The invention provides following aspects (1) to (12).

(1) A power system including:
a rotating body (e.g., a second gear 52 in an embodiment);
a housing (e.g., a housing 4 in an embodiment) that accommodates the rotating body; and
a storage portion (e.g., a storage portion 44 in an embodiment) that is provided in a bottom of the housing to store a liquid medium, wherein
the rotating body is partially located in the storage portion, and
an inner surface of the housing includes a protrusion (e.g., a protrusion 45 in an embodiment) that extends above the rotating body to intersect with a rotation direction of the rotating body.

(2) The power system according to aspect (1), wherein
the protrusion has a first guide surface (e.g., a first guide surface 45a in an embodiment) that is gradually inclined or curved toward a downstream side in the rotation direction of the rotating body from an axial center portion, which serves as a vertex, of the rotating body toward both axial sides.

(3) The power system according to aspect (2), wherein
the protrusion has a second guide surface (e.g., a second guide surface 45b in an embodiment) that is located on a side opposite to the first guide surface in the rotation direction of the rotating body and that is gradually inclined or curved toward an upstream side in the rotation direction of the rotating body from the axial center portion, which serves as a vertex, of the rotating body toward both the axial sides.

(4) The power system according to any one of (1) to (3), wherein
the inner surface of the housing includes a first rough surface portion (e.g., a first rough surface portion 46a in an embodiment) having a surface roughness larger than that of a wall surface of the storage portion in a region upstream of the protrusion in the rotation direction of the rotating body.

(5) The power system according to aspect (4), wherein
the inner surface of the housing includes a second rough surface portion (e.g., a second rough surface portion 46b in an embodiment) having a surface roughness larger than that of the wall surface of the storage portion in a region downstream of the protrusion in the rotation direction of the rotating body.

(6) The power system according to any one of aspects (1) to (5), wherein
an outer peripheral surface of the rotating body has a surface roughness larger than that of the wall surface of the storage portion.

(7) The power system according to any one of aspects (1) to (6), wherein
the power system is a vehicle power system, and
the rotation direction is a rotation direction of the rotating body when the vehicle moves forward.

(8) The power system according to any one of aspects (1) to (7), wherein
the power system includes:
an electric motor (e.g., an electric motor 2 in an embodiment) that drives a left wheel and a right wheel of the vehicle:
a transmission (e.g., a transmission 5 in an embodiment) that is disposed on power transmission paths between the electric motor and the left wheel and between the electric motor and the right wheel; and
a differential gear system (e.g., a differential gear system 6 in an embodiment) that distributes output power shifted by the transmission to the left wheel and the right wheel,
the housing accommodates the electric motor, the transmission, and the differential gear system, and
the transmission includes:
a first gear (e.g., a first gear 51 in an embodiment) that is mechanically connected to the electric motor:
a second gear (e.g., a second gear 52 in an embodiment) that has a rotation axis in common with the first gear and is mechanically connected to a differential gear casing (e.g., a differential gear casing 61 in an embodiment) of the differential gear system; and
a pinion gear (e.g., a pinion gear 53 in an embodiment) that meshes with the first gear and the second gear, and
the rotating body is the second gear.

(9) A power system including:
a rotating body (e.g., a second gear 52 in an embodiment):
a housing (e.g., a housing 4 in an embodiment) that accommodates the rotating body; and
a storage portion (e.g., a storage portion 44 in an embodiment) that is provided in a bottom of the housing to store a liquid medium, wherein
the rotating body is partially located in the storage portion, and
an inner surface of the housing includes a first rough surface portion (e.g., a first rough surface portion 46a in an embodiment) having a surface roughness larger than that of a wall surface of the storage portion between an uppermost part of the rotating body and the storage portion and in a region upstream of the uppermost part of the rotating body in a rotation direction of the rotating body.

(10) The power system according to aspect (9), wherein the inner surface of the housing includes a second rough surface portion (e.g., a second rough surface portion 46b in an embodiment) having a surface roughness larger than that of the wall surface of the storage portion between the uppermost part of the rotating body and the storage portion and in a region downstream of the uppermost part of the rotating body in the rotation direction of the rotating body.

(11) The power system according to aspect (9) or (10), wherein the power system is a vehicle power system, and
the rotation direction is a rotation direction of the rotating body when the vehicle moves forward.

(12) The power system according to any one of (9) to (11), wherein the power system includes:
an electric motor (e.g., an electric motor 2 in an embodiment) that drives a left wheel and a right wheel of a vehicle;
a transmission (e.g., a transmission 5 in an embodiment) that is disposed on power transmission paths between the electric motor and the left wheel and between the electric motor and the right wheel; and
a differential gear system (e.g., a differential gear system 6 in an embodiment) that distributes output power shifted by the transmission to the left wheel and the right wheel,
the housing accommodates the electric motor, the transmission, and the differential gear system, and
the transmission includes:
a first gear (e.g., a first gear in an embodiment) that is mechanically connected to the electric motor;
a second gear (e.g., a second gear 52 in an embodiment) that has a rotation axis in common with the first gear and is mechanically connected to a differential gear casing (e.g., a differential gear casing 61 in an embodiment) of the differential gear system; and
a pinion gear (e.g., a pinion gear 53 in an embodiment) that meshes with the first gear and the second gear, and
the rotating body is the second gear.

According to aspect (1), since the protrusion extends axially above the rotating body in the inner surface of the housing and intersects with the rotation direction of the rotating body, the liquid medium splashed by the rotation of the rotating body can flow in the extending direction of the protrusion.

According to aspect (2), since the protrusion has the first guide surface that is gradually inclined or curved toward the downstream side in the rotation direction from the axial center portion (serving as a vertex) of the rotating body toward both axial sides, the liquid medium splashed by the rotation of the rotating body can be smoothly guided to both axial sides.

According to aspect (3), since the protrusion has the second guide surface that is located on a side opposite to the first guide surface in the rotation direction of the rotating body and is gradually inclined or curved toward the upstream side in the rotation direction of the rotating body from the axial center portion (serving as a vertex) of the rotating body toward both the axial sides, even when the rotating body rotates in a reverse direction, the liquid medium splashed by the rotation of the rotating body can be smoothly guided to both the axial sides.

According to aspect (4), since the inner surface of the housing includes the first rough surface portion having a surface roughness larger than that of the wall surface of the storage portion in the region upstream of the protrusion in the rotation direction of the rotating body, the adhesion performance of the liquid medium to the inner surface of the housing is improved, and the splashing of the liquid medium by the rotating body is facilitated.

According to aspect (5), since the inner surface of the housing includes the second rough surface portion having a surface roughness larger than that of the wall surface of the storage portion in the region downstream of the protrusion in the rotation direction of the rotating body, even when the rotating body rotates in the reverse direction, the adhesion performance of the liquid medium to the inner surface of the housing is improved, and the splashing of the liquid medium by the rotating body is facilitated.

According to aspect (6), since the outer peripheral surface of the rotating body has a surface roughness larger than that of the wall surface of the storage portion, the splashing of the liquid medium by the rotating body is further facilitated.

According to aspect (7), appropriate lubrication can be performed at the time of forward movement of the vehicle which frequently occurs.

According to aspect (8), since the second gear mechanically connected to the differential gear casing of the differential gear system functions as the rotating body that splashes the liquid medium, the liquid medium can be splashed in conjunction with the running of the vehicle, and thus the necessary portion can be lubricated even when there is no oil pump.

According to aspect (9), since the inner surface of the housing includes the first rough surface portion having a surface roughness larger than that of the wall surface of the storage portion between the uppermost part of the rotating body and the storage portion and in the region upstream of the uppermost part of the rotating body in the rotation direction of the rotating body, the adhesion performance of the liquid medium to the inner surface of the housing is improved, and the splashing of the liquid medium by the rotating body is facilitated.

According to aspect (10), since the inner surface of the housing includes the second rough surface portion having a surface roughness larger than the wall surface of the storage portion between the uppermost part of the rotating body and the storage portion and in the region downstream of the uppermost part of the rotating body in the rotation direction of the rotating body, even when the rotating body rotates in the reverse direction, the adhesion performance of the liquid medium to the inner surface of the housing is improved and the splashing of the liquid medium by the rotating body is facilitated.

According to aspect (11), appropriate lubrication can be performed at the time of forward movement of the vehicle which frequently occurs.

According to aspect (12), since the second gear mechanically connected to the differential gear casing of the differential gear system functions as the rotating body that splashes the liquid medium, the liquid medium can be splashed in conjunction with the running of the vehicle, and thus the necessary portion can be lubricated even when there is no oil pump.

DETAILED DESCRIPTION

A power system 1 according to an embodiment of the invention will be described with reference to FIGS. 1 to 8.

The power system 1 of the embodiment includes an electric motor 2 that is a drive source for driving axles, and is provided in an electric motor vehicle such as a hybrid vehicle or an electric vehicle as a front wheel drive system or a rear wheel drive system.

[Power System]

Figure 1:
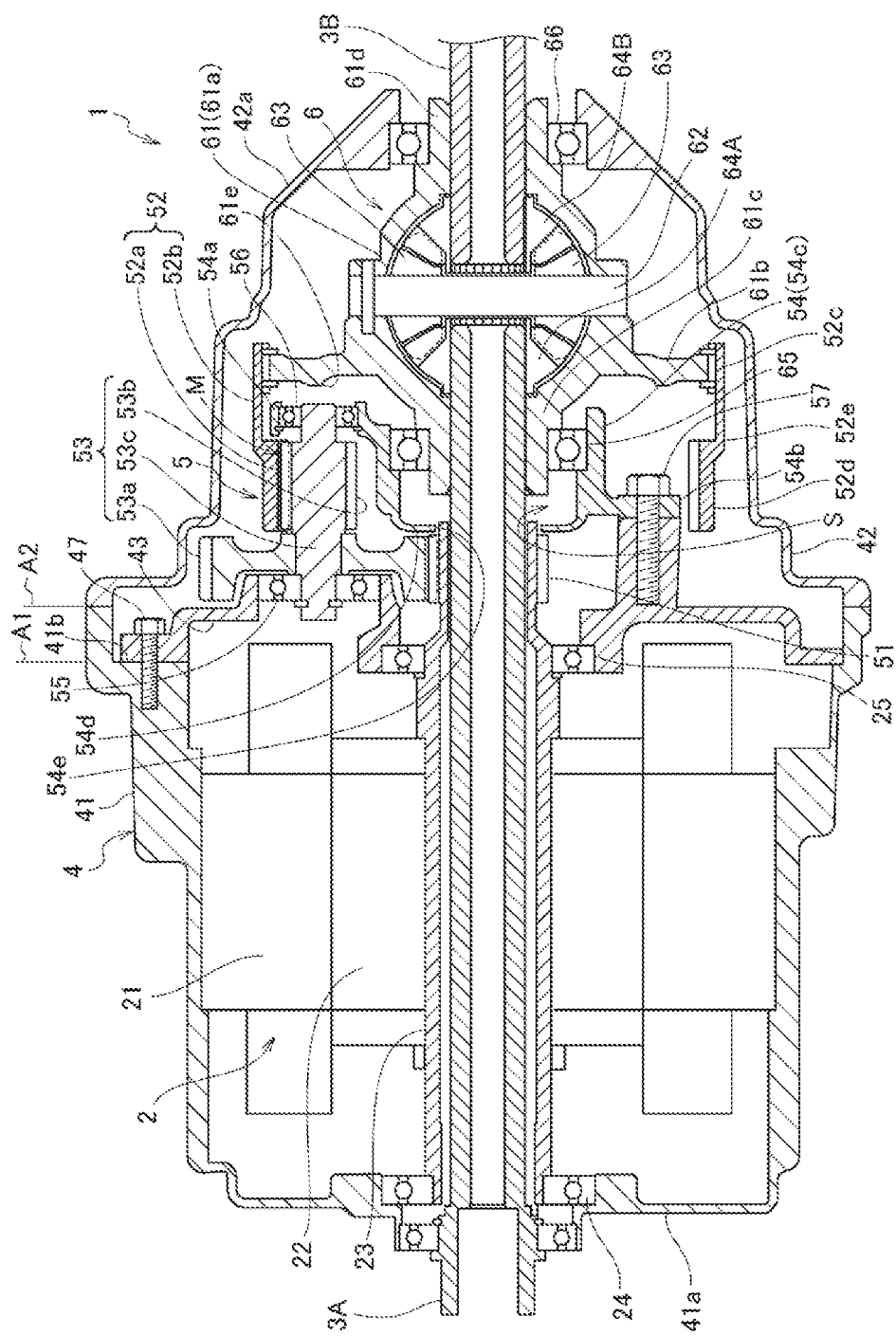
FIG. 1 is a sectional view of a power system according to an embodiment of the invention, and a sectional view taken along line A-A in FIG. 2.

In FIG. 1, reference numerals 3A and 3B indicate left and right axles, which are coaxially disposed in a vehicle width direction. In the power system 1, a housing 4 has the entire shape formed into a substantially cylindrical shape, and includes therein the electric motor 2 for driving the axles, a transmission 5 that decelerates driving rotation of the electric motor 2, and a differential gear system 6 that distributes the driving rotation decelerated by the transmission 5 to the axles 3A and 3B.

Figure 2:
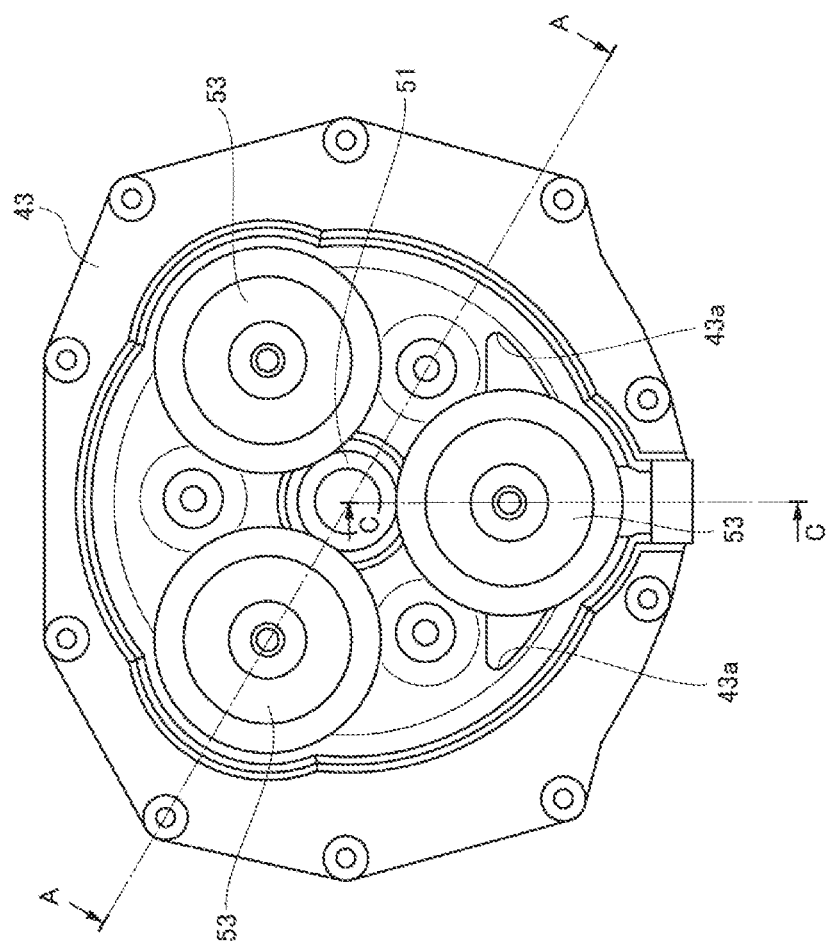
FIG. 2 is a side view of a partition wall and a pinion gear inside the power system when viewed from a differential gear system side.

The housing 4 includes a first casing 41 for accommodating the electric motor 2 and a second casing 42 for accommodating the transmission 5 and the differential gear system 6. A partition wall 43 is provided at a boundary between the first casing 41 and the second casing 42, and an internal space of the first casing 41 is partitioned from an internal space of the second casing 42 by the partition wall 43. The partition wall 43 is fastened to a step portion 41b provided on an outer peripheral part of the first casing 41 with a bolt 47. Therefore, a mating surface A1 of the first casing 41 and the partition wall 43 is located closer to the first casing 41 relative to a mating surface A2 of the first casing 41 and the second casing 42. A bottom of the housing 4 functions as a storage portion 44 for storing lubricating oil (liquid medium), and the lubricating oil is stored up to a stationary oil level L illustrated in FIG. 6. The stationary oil level L is set lower than an air gap G of the electric motor 2 (a clearance secured between an inner periphery of a stator 21 and an outer periphery of a rotor 22 to be described below) so as to reduce an agitation loss of the lubricating oil in the electric motor 2. As also illustrated in FIG. 2, a communication port 43a is formed in a lower part of the partition wall 43 to allow the lubricating oil to flow therethrough.

[Electric Motor]

The electric motor 2 includes the stator 21 fixed to an inner peripheral part of the first casing 41 and the rotor 22 disposed rotatably on the inner periphery of the stator 21. A rotor shaft 23 is coupled to an inner peripheral part of the rotor 22 so as to surround an outer periphery of one axle 3A, and the rotor shaft 23 is supported on an end wall 41a of the first casing 41 and the partition wall 43 through bearings 24 and 25 so as to be relatively rotable coaxially with the axle 3A. In addition, one end of the axle 3A and the rotor shaft 23 penetrates the partition wall 43 and extends into the second casing 42, and the other end of the axle 3A penetrates the end wall 41a of the first casing 41 and extends to the outside of the housing 4.

[Transmission]

The transmission 5 includes a first gear 51 mechanically connected to the electric motor 2, a second gear 52 having the same rotation axis as that of the first gear 51 and mechanically connected to a differential gear casing 61 of the differential gear system 6, a plurality of pinion gears 53 meshing with the first gear 51 and the second gear 52, and a pinion holder 54 for supporting the plurality of pinion gears 53 to be rotatable and not to revolve, and the decelerated driving rotation is output to the differential gear casing 61 of the differential gear system 6 through the pinion gear 53 and the second gear 52 when the driving rotation of the electric motor 2 is input from the first gear 51.

The first gear 51 is an external gear, and is formed integrally with the rotor shaft 23. The pinion gear 53 includes a large diameter gear 53a which is an external gear, a small diameter gear 53b which is an external gear, and an pinion shaft 53c which supports the large diameter gear 53a and the small diameter gear 53b in an integrally rotatable manner. The large diameter gear 53a is coupled to the pinion shaft 53c on a side of the electric motor 2, and meshes with the first gear 51. In addition, the small diameter gear 53b is formed integrally with the pinion shaft 53c on a side of the differential gear system 6, and meshes with the second gear 52. An end of the pinion shaft 53c on the side of the electric motor 2 is rotatably supported on the partition wall 43 through the bearing 55, and an end thereof on the side of the differential gear system 6 is rotatably supported on a pinion gear supporting portion 54a of the pinion holder 54 through the bearing 56.

As illustrated in FIG. 2, the transmission 5 of the embodiment includes three pinion gears 53. The three pinion gears 53 are disposed at equal intervals (intervals of 120°) in a circumferential direction around the first gear 51. At least one of the three pinion gears 53 is partially or entirely located in the storage portion 44 described above, and functions as a rotating body that splashes the lubricating oil stored in the storage portion 44 with the rotation caused by the driving of the electric motor 2. In the example illustrated in FIG. 2, the lowermost pinion gear 53 disposed immediately below the first gear 51 functions as a rotating body for splashing the lubricating oil, and thus the splashed lubricating oil is supplied to two upper pinion gears 53. Here, assuming that the pinion gear 53 rotates in the counterclockwise direction in FIG. 2, the lubricating oil splashed by the rotation of the lowermost pinion gear 53 is mainly supplied to the pinion gear located at an upper left, and then the lubricating oil scattered by the rotation of the pinion gear located at the upper left is mainly further supplied to the pinion gear located at an upper right.

In the second gear 52, a gear portion 52a is an internal gear and meshes with the small diameter gear 53b of the pinion gear 53. The second gear 52 includes a connecting portion 52b extending from the gear portion 52a toward the differential gear system 6 across the outer peripheral side of the pinion holder 54 (pinion gear supporting portion 54a), and the connecting portion 52b is mechanically connected to the differential gear casing 61 of the differential gear system 6 through a connecting unit such as a spline. In other words, the second gear 52 includes a second-gear large diameter portion 52c constituting the connecting portion 52b with the differential gear casing 61, a second-gear small diameter portion 52d constituting the gear portion 52a meshing with the pinion gear 53, and a second gear connecting portion 52e for connecting the second-gear large diameter portion 52c and the second-gear small diameter portion 52d, and an outer diameter of the second-gear small diameter portion 52d is smaller than that of the second-gear large diameter portion 52c. Further, the second gear 52 has a lower end located in the storage portion 44 described above, and also functions as a rotating body for splashing the lubricating oil stored in the storage portion 44 with the rotation caused by the driving of the electric motor 2.

Figure 3:
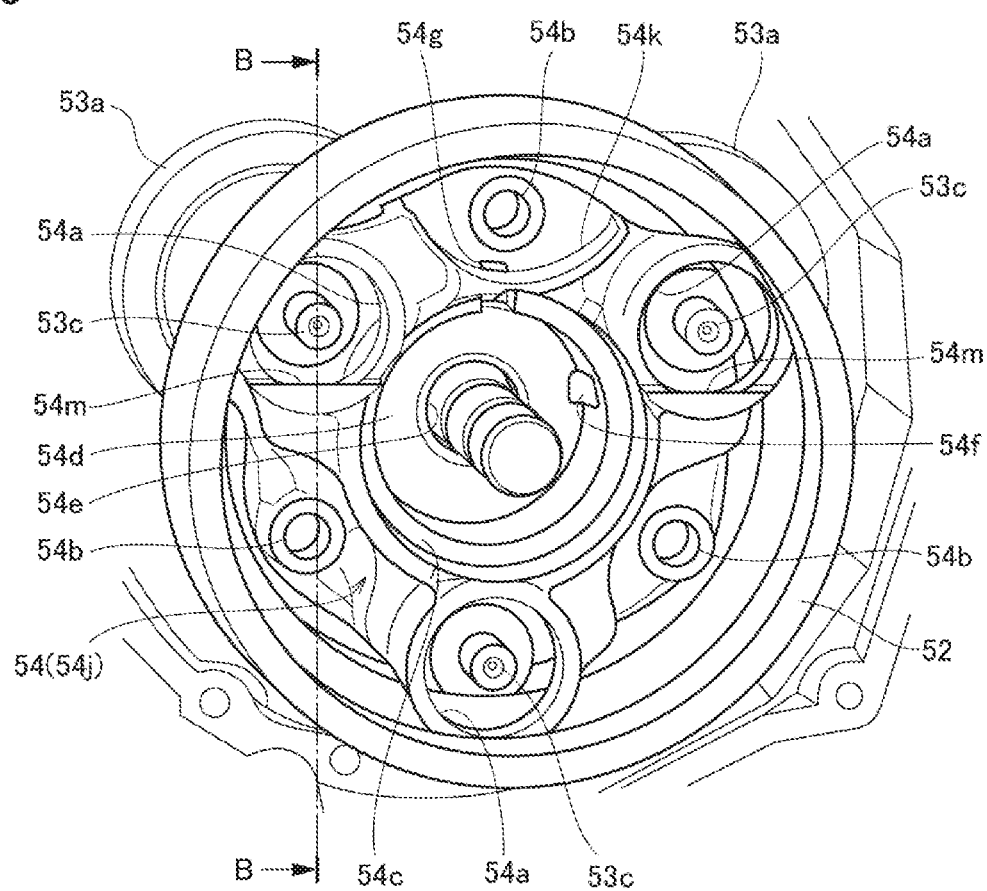
FIG. 3 is a perspective view of the pinion gear, a second gear, and a pinion holder (bearing is not illustrated) when viewed from the differential gear system side.
Figure 4:
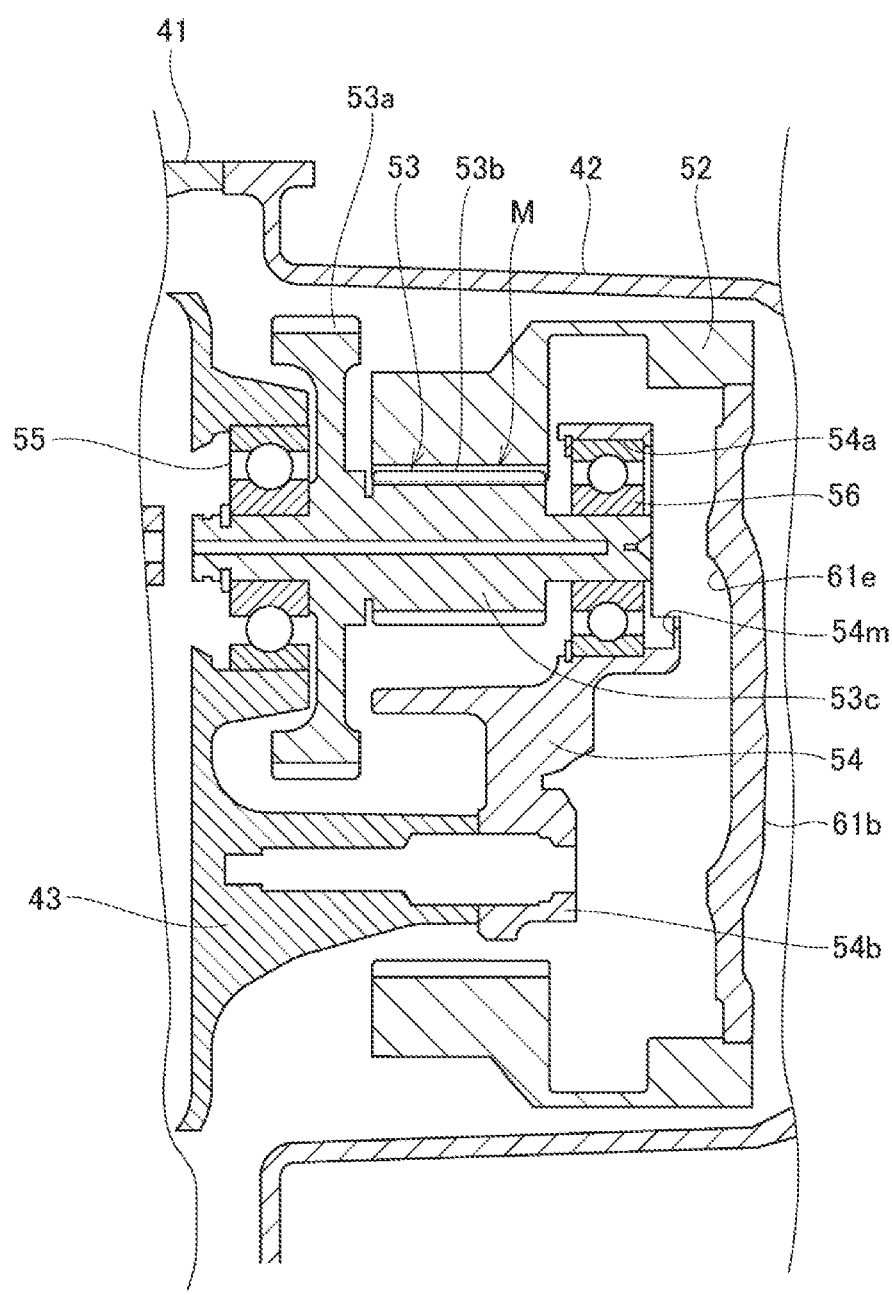
FIG. 4 is a sectional view taken along line B-B in FIG. 3.
Figure 5:
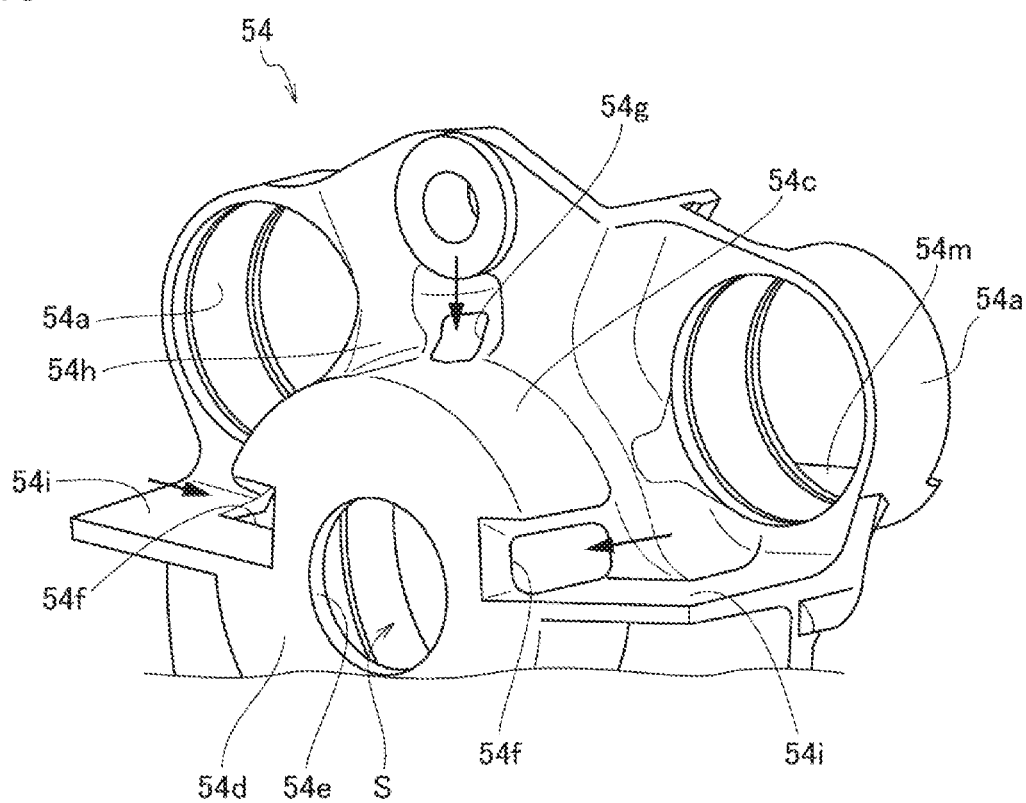
FIG. 5 is a perspective view of a main part of the pinion holder when viewed from the pinion gear side.
Figure 6:
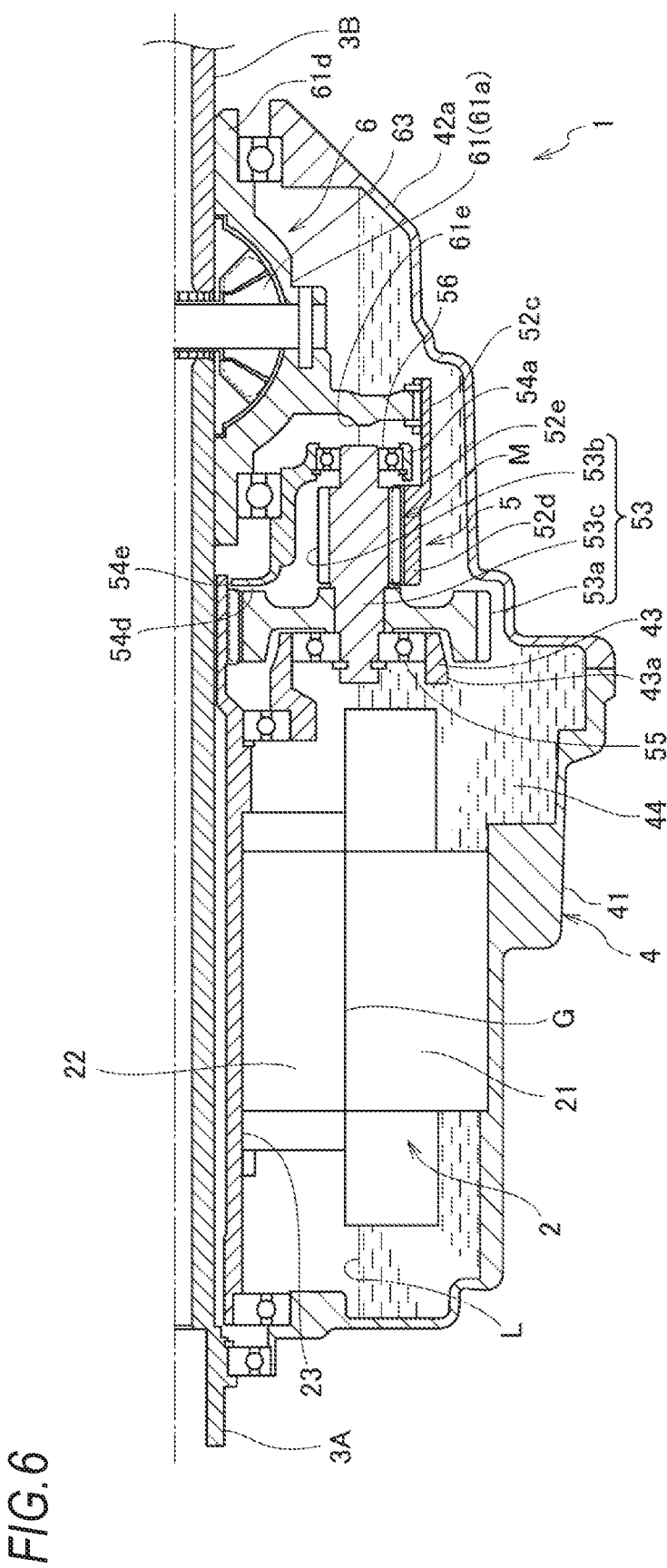
FIG. 6 is a partial sectional view of the power system illustrated in FIG. 1, and is a sectional view taken along line C-C in FIG. 2.

As illustrated in FIGS. 3 to 5, the pinion holder 54 includes three pinion gear supporting portions 54a each of which supports the pinion shaft 53c of the pinion gear 53 through the bearing 56, three fixed portions 54b that are fixed to the partition wall 43, and a bottomed cylindrical cup portion 54c formed on a center (on an inner diameter side of the pinion gear supporting portion 54a and the fixed portion 54b) of the pinion holder 54.

The pinion gear supporting portion 54a is disposed on the side of the differential gear casing 61 of the differential gear system 6 relative to a meshing portion M between the second gear 52 mechanically connected to the differential gear casing 61 of the differential gear system 6 and the small diameter gear 53b of the pinion gear 53. Thus, the other end of the pinion shaft 53c, in which one end thereof is supported by the partition wall 43 through the bearing 55, is supported by the pinion gear supporting portion 54a through the bearing 56, and thus the pinion gear 53 can be appropriately supported in a state of being held at both sides.

The three fixed portions 54b are located at intermediate portions between the pinion gear supporting portions 54a adjacent to each other in the circumferential direction, and are fastened to the partition wall 43 with bolts 57, respectively. Thereby, the partition wall 43 serves as a support member of the pinion holder 54 as well as a support member of the pinion shaft 53c.

The cup portion 54c surrounds the outer periphery of one axle 3A through the space portion S from one end side to the other end side of the meshing portion M in the axial direction and on the inner peripheral side of the meshing portion M in the radial direction, and the bottom 54d on one end side is provided with a through-hole 54e through which the axle 3A penetrates. In addition, the inner peripheral part on the other end side of the cup portion 54c rotatably supports one end side of the differential gear casing 61 through the bearing 65. Thereby, the pinion holder 54 serves as a support member of the differential gear casing 61 as well as a support member of the pinion gear 53.

[Differential Gear System]

The differential gear system 6 includes the differential gear casing 61, a differential pinion shaft 62, a differential pinion gear 63, and left and right side gears 64A and 64B so as to allow difference in rotation of the left and right axles 3A and 3B while distributing the driving rotation, which is input to the differential gear casing 61 from the second gear 52, to the left and right axles 3A and 3B.

The differential gear casing 61 includes a spherical differential gear casing body 61a that accommodates the differential pinion shaft 62, the differential pinion gear 63, and the left and right side gears 64A and 64B, an input plate 61b that extends in the radial direction from the outer periphery of the differential gear casing body 61a and is mechanically connected to the second gear 52, and left and right extension portions 61c and 61d that extend in the axial direction from both sides of the differential gear casing body 61a. One extension portion 61c rotatably supports the one axle 3A at an inner peripheral part thereof, and an outer peripheral part thereof is rotatably supported by the pinion holder 54 through the bearing 65. Further, the other extension portion 61d rotatably supports the other axle 3B at an inner peripheral part thereof, and an outer peripheral part thereof is rotatably supported by the end wall 42a of the second casing 42 through the bearing 66.

The differential pinion shaft 62 is supported by the differential gear casing body 61a so as to be directed in a direction orthogonal to the axles 3A and 3B, and rotatably supports two differential pinion gears 63, which are bevel gears, inside the differential gear casing body 61a. That is, the differential pinion shaft 62 allows the differential pinion gears 63 to rotate while revolving with the rotation of the differential gear casing 61.

The left and right side gears 64A and 64B are bevel gears, are rotatably supported inside the differential gear casing body 61a so as to mesh with the differential pinion gears 63 from both sides, and are mechanically connected to the left and right axels 3A and 3B through the connecting unit such as the spline. In a state where the differential pinion gears 63 revolve without rotating, for example, during straight running, the left and right side gears 64A and 64B rotate at a constant speed, and the driving rotation is transmitted to the left and right axles 3A and 3B. Furthermore, during curve running or left or right turning, the differential pinion gears 63 rotate, so that the left and right side gears 64A and 64B rotate relative to each other and the difference in rotation between the left and right axles 3A and 3B is allowed.

[Lubrication Function of Pinion Holder]

Next, a lubrication function of the pinion holder 54 will be described.

The pinion holder 54 has a storage space to store lubricating oil splashed from the storage portion 44 of the housing 4 by the second gear 52 or the pinion gear 53. The storage space is the above-described space portion S formed by the cup portion 54c and the one axle 3A, and the lubricating oil splashed by the second gear 52 or the pinion gear 53 flows into the space portion S through communication holes 54f and 54g (which will be described below) communicating with the space portion S.

The lubricating oil flowing into the space portion S is supplied to the above-described bearing 65 which is disposed adjacent to the space portion S for rotatably supporting one end side of the differential gear casing 61, whereby the bearing 65 is properly lubricated. In addition, the lubricating oil is also distributed from the space portion S to the inside of the differential gear system 6 requiring lubrication and the electric motor 2 that needs to be cooled by the lubricating oil. More specifically, the lubricating oil is supplied from the space portion S through the clearance between the axle 3A and the extension portion 61c of the differential gear casing 61 to the inside of the differential gear system 6, and is supplied from the space portion S to the electric motor 2 through the clearance between the axle 3A and the rotor shaft 23.

As illustrated in FIG. 5, the pinion holder 54 includes first guide portions 54i for receiving the lubricating oil, which is splashed by the second gear 52 or the pinion gear 53, on a first face 54h opposed to the pinion gear 53. The first guide portions 54i are protrusions that are formed on both sides of the cup portion 54c and extend linearly toward the cup portion 54c, and guide the received lubricating oil to the cup portion 54c. The communication hole 54f is formed in a connecting portion between the first guide portion 54i and the cup portion 54c, so that the lubricating oil received by the first guide portion 54i is stored in the space portion S through the communication hole 54f.

As illustrated in FIG. 3, the pinion holder 54 includes a second guide portion 54k for receiving the lubricating oil, which is splashed by the second gear 52 or the pinion gear 53, on a second face 54j opposed to the differential gear casing 61 of the differential gear system 6. The second guide portion 54k is a protrusion that is formed above the cup portion 54c and extends in an arc shape below the uppermost fixed portion 54b, and guides the received lubricating oil to the cup portion 54c. The communication hole 54g is formed in a connecting portion between the second guide portion 54k and the cup portion 54c, so that the lubricating oil received by the second guide portion 54k is stored in the space portion S through the communication hole 54g. The communication hole 54g also communicates with the first face 54h of the pinion holder 54.

As illustrated in FIGS. 3 and 4, among the pinion gear supporting portions 54a of the pinion holder 54, the pinion gear supporting portions 54a supporting the two upper pinion gears 53 respectively include pockets 54m that store the lubricating oil at an opening end on the side of the second face 54j opposed to the differential gear casing 61 of the differential gear system 6. The pocket 54m temporality holds the lubricating oil supplied to the pinion gear supporting portion 54a, thereby enabling proper lubrication of the bearing 56.

By the way, some of the lubricating oil supplied from the space portion S to the bearing 65 flows to the outer periphery of the differential gear casing 61 by passing through the bearing 65, and receives a centrifugal force caused by the rotation of the differential gear casing 61 and moves radially outward along the input plate 61b. The input plate 61b of the embodiment includes a third guide portion 61e that guides the lubricating oil moving radially outward along the input plate 61b to the two upper pinion gear supporting portions 54a. The third guide portion 61e is an edge of an annular recess formed on a surface of the input plate 61b opposed to the pinion gear 53, and the lubricating oil moving radially outward along the input plate 61b is guided to the pinion gear supporting portion 54a by the edge formed in a position opposed to the pinion gear supporting portion 54a in the radial direction. Some of the lubricating oil splashed by the second gear 52 also flows in the same manner.

[Improvement of Lubrication Function by Second Gear]

Figure 7:
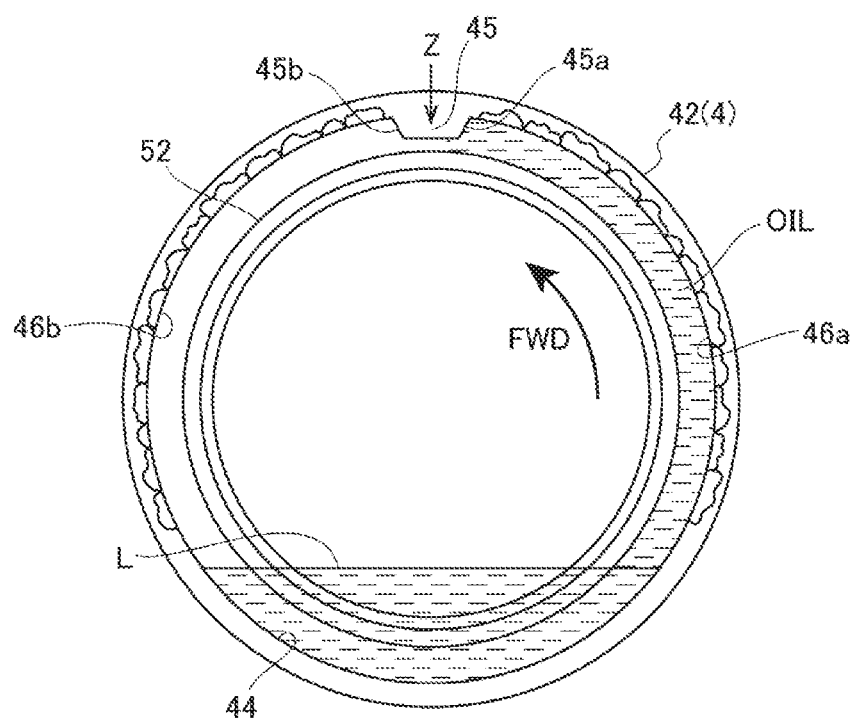
FIG. 7 is a schematic diagram illustrating an inner surface of a housing and a second gear.
Figure 8:
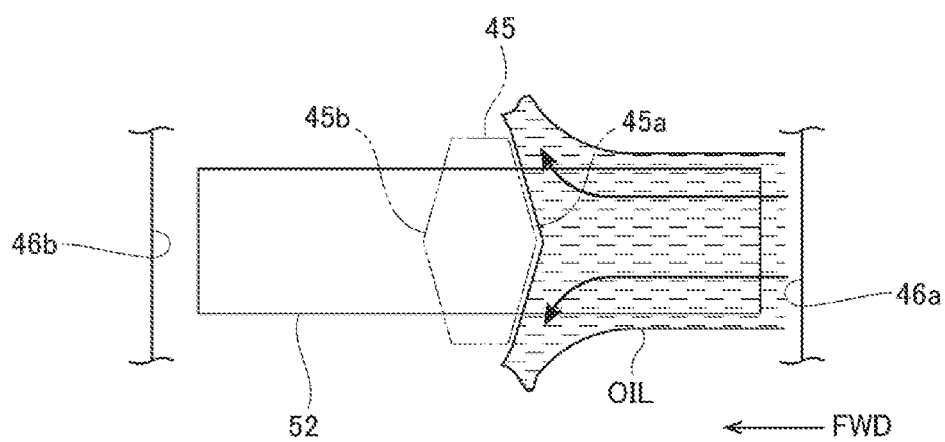
FIG. 8 is a schematic diagram of main portions illustrated in FIG. 7 when viewed in a Z-direction.

Next, a description will mainly be given on a configuration for improving the lubrication function by the second gear 52 with reference to FIGS. 7 and 8.

A rotation direction indicated by an arrow (FWD) in FIGS. 7 and 8 is a rotation direction of the second gear 52 at the time of forward movement of the vehicle, and FIG. 7 illustrates the rotation direction of the second gear 52 when viewed from the side of the electric motor 2. In FIGS. 7 and 8, reference numeral OIL is given to the lubricating oil splashed by the rotation of the second gear 52.

As illustrated in FIG. 7, a protrusion 45 extends axially above the second gear 52 in the inner surface of the housing 4 (second casing 42) and intersects with the rotation direction of the second gear 52. The protrusion 45 receives the lubricating oil OIL splashed by the rotation of the second gear 52, and the received lubricating oil OIL flows in the extending direction of the protrusion 45. Thus, the lubricating oil OIL splashed by the rotation of the second gear 52 can spread over a wide range.

As illustrated in FIG. 8, the protrusion 45 has a first guide surface 45a that is gradually inclined or curved toward the downstream side in the rotation direction from an axial center portion (serving as a vertex) of the second gear 52 toward both axial sides. The first guide surface 45a smoothly guides the lubricating oil OIL splashed by the rotation of the second gear 52 to both axial sides.

In addition, the protrusion 45 has a second guide surface 45b that is located on a side opposite to the first guide surface 45a in the rotation direction of the second gear 52 and is gradually inclined or curved toward the upstream side in the rotation direction of the second gear 52 from the axial center portion (serving as a vertex) of the second gear 52 toward both axial sides. The second guide surface 45b smoothly guides the lubricating oil OIL splashed by the rotation of the second gear 52 to both axial sides when the second gear 52 rotates in a reverse direction.

Returning to FIG. 7, a first rough surface portion 46a having a surface roughness larger than that of a wall surface of the storage portion 44 is provided in a region upstream of the protrusion 45 in the rotation direction of the second gear 52 in the inner surface of the housing 4. The first rough surface portion 46a improves adhesion performance of the lubricating oil to the inner surface of the housing 4, and facilitates splashing of the lubricating oil by the second gear 52.

In addition, a second rough surface portion 46b having a surface roughness larger than that of the wall surface of the storage portion 44 is provided in a region downstream of the protrusion 45 in the rotation direction of the second gear 52 in the inner surface of the housing 4. The second rough surface portion 46b improves adhesion performance of the lubricating oil to the inner surface of the housing 4 when the second gear 52 rotates in the reverse direction, and facilitates splashing of the lubricating oil by the second gear 52.

Further, the outer peripheral surface of the second gear 52 preferably has a surface roughness larger than that of the wall surface of the storage portion 44. With this configuration, adhesion performance of the lubricating oil to the outer peripheral surface of the second gear 52 is improved, and the splashing of the lubricating oil by the second gear 52 is further facilitated.

As described above, according to the embodiment, since the protrusion 45 extends axially above the second gear 52 in the inner surface of the housing 4 and intersects with the rotation direction of the second gear 52, the lubricating oil OIL splashed by the rotation of the second gear 52 can flow in the extending direction of the protrusion 45.

In addition, since the protrusion 45 of the embodiment has the first guide surface 45a that is gradually inclined or curved toward the downstream side in the rotation direction from the axial center portion (serving as a vertex) of the second gear 52 toward both axial sides, the lubricating oil OIL splashed by the rotation of the second gear 52 can be smoothly guided to both axial sides.

Further, since the protrusion 45 of the embodiment has the second guide surface 45b that is located on a side opposite to the first guide surface 45a in the rotation direction of the second gear 52 and is gradually inclined or curved toward the upstream side in the rotation direction of the second gear 52 from the axial center portion (serving as a vertex) of the second gear 52 toward both axial sides, even when the second gear 52 rotates in a reverse direction, the lubricating oil OIL splashed by the rotation of the second gear 52 can be smoothly guided to both axial sides.

In the first guide surface 45a and the second guide surface 45b, the vertex is not limited to the axial center portion of the second gear 52, and may be shifted from the axial center portion of the second gear 52 to one side or the other side. In the first guide surface 45a and the second guide surface 45b, when the vertex is shifted from the axial center portion of the second gear 52, it is possible to regulate the flow rate of the oil flowing to one side and the other side (a left and right direction in FIG. 1, and an up and down direction in FIG. 8) of the second gear 52.

In the embodiment, since the first rough surface portion 46a having the surface roughness larger than that of the wall surface of the storage portion 44 is provided in the region upstream of the protrusion 45 in the rotation direction of the second gear 52 in the inner surface of the housing 4, the adhesion performance of the lubricating oil to the inner surface of the housing 4 is improved, and the splashing of the lubricating oil by the second gear 52 is facilitated.

In the embodiment, further, since the second rough surface portion 46b having the surface roughness larger than that of the wall surface of the storage portion 44 is provided in the region downstream of the protrusion 45 in the rotation direction of the second gear 52 in the inner surface of the housing 4, even when the second gear 52 rotates in the reverse direction, the adhesion performance of the lubricating oil to the inner surface of the housing 4 is improved and the splashing of the lubricating oil by the second gear 52 is facilitated.

In addition, since the outer peripheral surface of the second gear 52 of the embodiment has the surface roughness larger than that of the wall surface of the storage portion 44, the splashing of the lubricating oil by the second gear 52 is further facilitated.

In the embodiment, appropriate lubrication can be performed at the time of forward movement of the vehicle which frequently occurs.

In the embodiment, further, since the second gear 52 mechanically connected to the differential gear casing 61 of the differential gear system 6 functions as a rotating body that splashes the lubricating oil, the lubricating oil can be splashed in conjunction with the running of the vehicle, and thus the necessary portion can be lubricated even when there is no oil pump.

It is noted that the invention is not limited to the above-described embodiment, but can be appropriately modified and improved, for example.

For example, the number of pinion gears 53 is not limited to three, but may be one, two, or four or more.

The power system 1 may adopt a forced lubrication system using an oil pump together with the splashing type lubrication system.

The invention claimed is:
1. A power system comprising:
a rotating body;
a housing that accommodates the rotating body; and
a storage portion that is provided in a bottom of the housing to store a liquid medium, wherein
the rotating body is partially located in the storage portion,
an inner surface of the housing comprises a protrusion that extends above the rotating body to intersect with a rotation direction of the rotating body, and
the protrusion has a first guide surface that is gradually inclined or curved toward a downstream side in the rotation direction of the rotating body from an axial center portion, which serves as a vertex, of the rotating body toward both axial sides.
2. The power system according to claim 1, wherein
the protrusion has a second guide surface that is located on a side opposite to the first guide surface in the rotation direction of the rotating body and that is gradually inclined or curved toward an upstream side in the rotation direction of the rotating body from the axial center portion, which serves as a vertex, of the rotating body toward both the axial sides.
3. The power system according to claim 1, wherein
the inner surface of the housing comprises a first rough surface portion having a surface roughness larger than that of a wall surface of the storage portion in a region upstream of the protrusion in the rotation direction of the rotating body.
4. The power system according to claim 3, wherein
the inner surface of the housing comprises a second rough surface portion having a surface roughness larger than that of the wall surface of the storage portion in a region downstream of the protrusion in the rotation direction of the rotating body.
5. The power system according to claim 1, wherein
an outer peripheral surface of the rotating body has a surface roughness larger than that of the wall surface of the storage portion.
6. The power system according to claim 1, wherein
the power system is a vehicle power system, and
the rotation direction is a rotation direction of the rotating body when the vehicle moves forward.
7. The power system according to claim 1, wherein
the power system comprises:
an electric motor that drives a left wheel and a right wheel of the vehicle;
a transmission that is disposed on power transmission paths between the electric motor and the left wheel and between the electric motor and the right wheel; and
a differential gear system that distributes output power shifted by the transmission to the left wheel and the right wheel,
the housing accommodates the electric motor, the transmission, and the differential gear system, and
the transmission comprises:
a first gear that is mechanically connected to the electric motor;
a second gear that has a rotation axis in common with the first gear and is mechanically connected to a differential gear casing of the differential gear system; and
a pinion gear that meshes with the first gear and the second gear, and
the rotating body is the second gear.
8. A power system comprising:
a rotating body;
a housing that accommodates the rotating body; and
a storage portion that is provided in a bottom of the housing to store a liquid medium, wherein
the rotating body is partially located in the storage portion,
an inner surface of the housing comprises a first rough surface portion having a surface roughness larger than that of a wall surface of the storage portion between an uppermost part of the rotating body and the storage portion and in a region upstream of the uppermost part of the rotating body in a rotation direction of the rotating body,
the power system comprises:
an electric motor that drives a left wheel and a right wheel of a vehicle;
a transmission that is disposed on power transmission paths between the electric motor and the left wheel and between the electric motor and the right wheel; and a differential gear system that distributes output power shifted by the transmission to the left wheel and the right wheel, the housing accommodates the electric motor, the transmission, and the differential gear system, the transmission comprises:
- a first gear that is mechanically connected to the electric motor;
- a second gear that has a rotation axis in common with the first gear and is mechanically connected to a differential pear casing of the differential gear system; and
- a pinion gear that meshes with the first gear and the second gear, and the rotating body is the second gear.

9. The power system according to claim 8, wherein
the inner surface of the housing comprises a second rough surface portion having a surface roughness larger than that of the wall surface of the storage portion between the uppermost part of the rotating body and the storage portion and in a region downstream of the uppermost part of the rotating body in the rotation direction of the rotating body.

10. The power system according to claim 8, wherein
the power system is a vehicle power system, and
the rotation direction is a rotation direction of the rotating body when the vehicle moves forward.

* * * * *